US008947715B2

(12) United States Patent
Ishii et al.

(10) Patent No.: US 8,947,715 B2
(45) Date of Patent: Feb. 3, 2015

(54) PRINTER FOR DISPLAYING CHARACTERS, BLOCK NUMBERS AND BLOCK BREAK LINE

(71) Applicants: Hidekazu Ishii, Inazawa (JP); Shanshan Guan, Nagoya (JP); Keisuke Tomatsu, Anjo (JP)

(72) Inventors: Hidekazu Ishii, Inazawa (JP); Shanshan Guan, Nagoya (JP); Keisuke Tomatsu, Anjo (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/023,703

(22) Filed: Sep. 11, 2013

(65) Prior Publication Data

US 2014/0085668 A1    Mar. 27, 2014

(30) Foreign Application Priority Data

Sep. 25, 2012  (JP) ................. 2012-211433

(51) Int. Cl.
  *G06K 15/02*  (2006.01)
  *G06K 15/00*  (2006.01)
  *G06F 3/12*  (2006.01)
  (Continued)

(52) U.S. Cl.
  CPC ............ *G06K 15/005* (2013.01); *G06K 15/022* (2013.01); *B41J 3/4075* (2013.01); *G06F 3/0481* (2013.01); *B41J 3/46* (2013.01)
  USPC ....... 358/1.15; 358/1.11; 358/1.13; 358/1.18; 358/3.11; 358/3.12; 358/3.31

(58) Field of Classification Search
  CPC . G06K 15/005; G06K 15/022; G06K 15/024; G06F 3/0484; G06F 3/0485; B41J 3/4075
  See application file for complete search history.

(56) References Cited

U.S. PATENT DOCUMENTS 5,651,619 A   7/1997   Nunokawa et al.
5,836,061 A   11/1998  Castillo et al.
(Continued)

FOREIGN PATENT DOCUMENTS

EP   0 768 611   4/1997
JP   6115207     4/1994
(Continued)

OTHER PUBLICATIONS

Machine translation of JP Pub 2012-153046 in english to Suzuki et al.*

(Continued)

*Primary Examiner* — Eric A Rust
*Assistant Examiner* — Haris Sabah
(74) *Attorney, Agent, or Firm* — McCarter & English, LLP

(57) ABSTRACT

A printer is configured to print on a tape-type print medium. The printer includes a processor and a memory. The memory is configured to store computer-readable instructions that instruct the printer to perform a process including displaying, on a display portion, characters, a block break line, and block numbers in a case where print data include block data and block break data. The block break line is a line segment that indicates a break position between adjacent blocks of a plurality of blocks. Each of the plurality of blocks contains at least one line's worth of characters. The block numbers indicate sequence numbers for the plurality of blocks. The block data is data for the plurality of blocks. The block break data is data that indicate the break position. The plurality of blocks is to be printed in a first direction in which the plurality of blocks are arrayed.

5 Claims, 21 Drawing Sheets

(51) Int. Cl.
*B41J 3/407* (2006.01)
*G06F 3/0481* (2013.01)
*B41J 3/46* (2006.01)

(56) References Cited

U.S. PATENT DOCUMENTS 5,868,504 A 2/1999 Nunokawa et al.
2002/0197090 A1 12/2002 Akaiwa

FOREIGN PATENT DOCUMENTS

JP 2012153046 * 8/2012
WO 2008122635 10/2008

OTHER PUBLICATIONS

Extended European Search Report issued in Application No. 13184714.7 on Feb. 10, 2014.

* cited by examiner

PRINTER FOR DISPLAYING CHARACTERS, BLOCK NUMBERS AND BLOCK BREAK LINE

CROSS-REFERENCE TO RELATED APPLICATION

This application claims priority to Japanese Patent Application No. 2012-211433 filed Sep. 25, 2012, the content of which is hereby incorporated herein by reference.

BACKGROUND

The present disclosure relates to a printer that is capable of performing printing on a tape-type print medium.

A printer is known that is capable of printing characters (text characters, symbols, numerals, and the like) in a plurality of lines that are arrayed across the width of a tape-type print medium, and that is capable of printing a plurality of blocks that are arrayed longitudinally on the print medium. Each one of the plurality of the blocks contains a given number of lines of characters. For example, for a known tape printer, the concept of a paragraph (the equivalent of a block) is introduced. The paragraph is the unit at which the text layout is defined for a cut tape, and is an aggregation of one or more lines that are printed on the tape at the same time. Paragraphs are differentiated according to differences in attributes of the paragraphs. The tape printer includes a liquid crystal display. Text characters and the like that a user has input may be displayed in a display area of the liquid crystal display.

SUMMARY

The display area of the liquid crystal display of the printer may be small. For example, the display area of the liquid crystal display of the tape printer that is described above is limited to two lines of six characters. Therefore, the number of text characters that can be displayed on the display is small. Accordingly, in a case where a plurality of the blocks are formed and a large number of characters are input, the user may lose track of which of the blocks is being displayed on the display.

Embodiments of the broad principles derived herein provide/An object of the present invention is to provide a printer that enables the user to easily determine which block is being displayed.

Embodiments provide a printer that is configured to print on a tape-type print medium. The printer includes a processor and a memory. The memory is configured to store computer-readable instructions that instruct the printer to perform a process including displaying, on a display portion, characters, a block break line, and block numbers in a case where print data include block data and block break data. The block break line is a line segment that indicates a break position between adjacent blocks of a plurality of blocks. Each of the plurality of blocks contains at least one line's worth of characters. The block numbers indicate sequence numbers for the plurality of blocks. The block data is data for the plurality of blocks. The block break data is data that indicate the break position. The plurality of blocks is to be printed in a first direction in which the plurality of blocks are arrayed.

BRIEF DESCRIPTION OF THE DRAWINGS

Embodiments will be described below in detail with reference to the accompanying drawings in which.

DETAILED DESCRIPTION

Hereinafter, an embodiment will be explained with reference to the drawings. The overall structure of a printer 1 according to the present embodiment will be explained with reference to FIGS. 1 and 2. The printer 1 is capable of printing characters (text characters, symbols, numerals, and the like) in units of lines that are arrayed across the width of a tape-type print medium 50 (refer to FIG. 2). The printer 1 is also capable of printing a plurality of blocks in an arraying direction (refer to FIG. 11). Each one of the plurality of the blocks contains a given number of lines of characters. The arraying direction is the direction in which the blocks are arrayed, and is the longitudinal direction of the print medium 50. In the explanation that follows, the upper right side, the lower left side, the lower right side, the upper left side, the top side, and the bottom side in FIGS. 1 and 2 are respectively defined as the rear side, the front side, the right side, the left side, the top side, and the bottom side of the printer 1.

Figure 1:
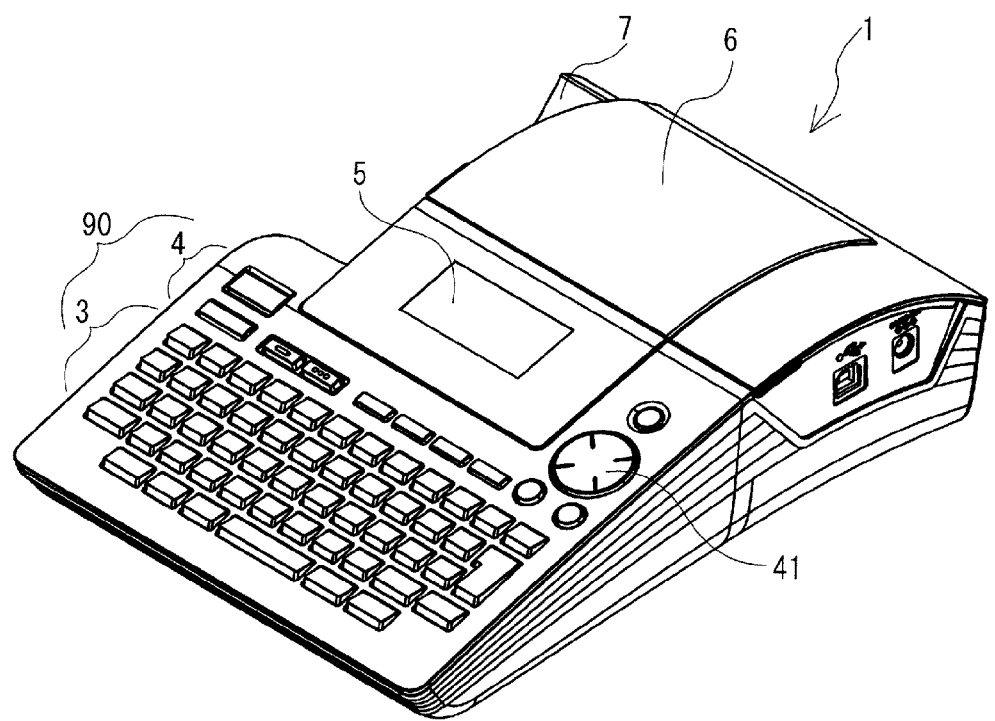
FIG. 1 is an oblique view of a printer 1.

As shown in FIG. 1, a keyboard 3 is provided on a top face of the printer 1. The keyboard 3 is used for inputting a character. A function key cluster 4 is provided at the rear (in FIG.

1, to the upper right) of the keyboard 3. The function key cluster 4 includes a Power key, a Set key, a Print key, a cursor key 41, and the like. By operating the cursor key 41, a user can move a cursor 79 (refer to FIGS. 5 to 9) that is displayed on a display 5 up, down, to the left and to the right. In the explanation that follows, in a case where the keyboard 3 and the function key cluster 4 are referenced collectively, the keyboard 3 and the function key cluster 4 are referred to as an input portion 90. The display 5 is provided at the rear of the function key cluster 4. Characters and the like that have been input may be displayed on the display 5. A cover 6 that can be opened and closed is provided in the rear portion of the top face of the printer 1. The cover 6 may be opened and closed with the rear edge of the cover 6, which extends in the left-right direction, serving as a pivot point. A tape tray 7 is provided at the left rear corner of the printer 1. The tape tray 7 may receive a print medium 50 (refer to FIG. 11) on which printing has been completed and that has been cut.

Figure 2:
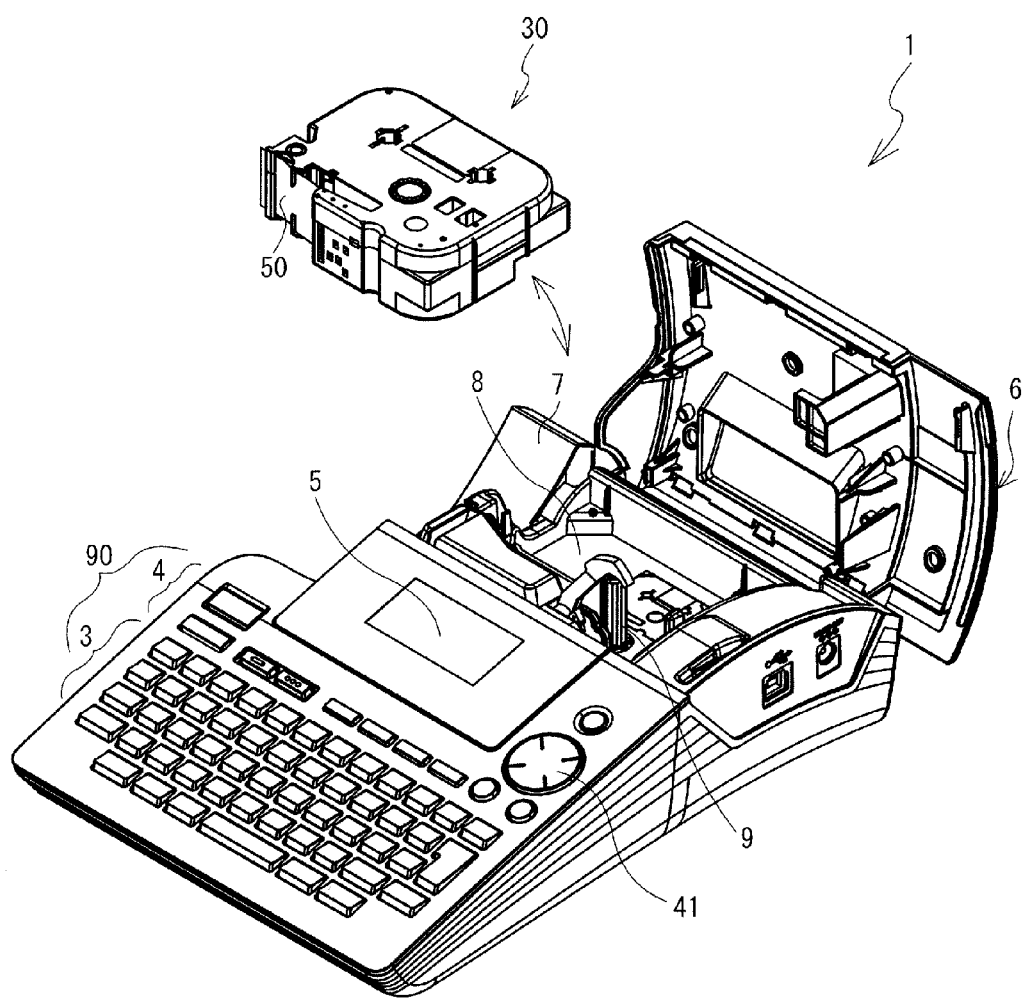
FIG. 2 is an oblique view of the printer 1 in a state in which a cover 6 is open and of a tape cassette 30 that will be mounted in a cassette mounting portion 8 of the printer 1.

As shown in FIG. 2, a cassette mounting portion 8 is provided at the rear of the display 5. A tape cassette 30 may be mounted in and removed from the cassette mounting portion 8 by being moved downward and upward, respectively. The print medium 50 and an ink ribbon (not shown in the drawings) are wound in the interior of the tape cassette 30. The print medium 50 may be, for example, a label tape with a release paper provided on one face. When the release paper is peeled off, the label tape can be affixed onto another object. A ribbon winding shaft 9, a tape drive shaft (not shown in the drawings), a platen roller (not shown in the drawings), a thermal head 10 (refer to FIG. 3), and the like are provided in the cassette mounting portion 8 of the printer 1. The ribbon winding shaft 9 may wind up the ink ribbon. The tape drive shaft may feed the print medium 50. The thermal head 10 may perform printing by heating the ink ribbon.

When the printer 1 performs printing, the print medium 50 is fed by the tape drive shaft and the platen roller as the ink ribbon is pulled out by the ribbon winding shaft 9. Then, as the print medium 50 and the ink ribbon are pressed against the thermal head 10 by the platen roller, the printing on the print medium 50 is performed by the thermal head 10 via the ink ribbon. A moving blade (not shown in the drawings) is provided on the feed path of the print medium 50. The printed print medium 50 is cut by the moving blade and is discharged to the outside of the printer 1. Various types of tape cassettes can be used as the tape cassette 30. For example, the tape cassette 30 may be a tape cassette for forming a laminated tape whose surface is protected by a transparent film. The tape cassette 30 may be a tape cassette for forming a cloth tape that can be affixed onto clothing or the like by using an iron.

Figure 3:
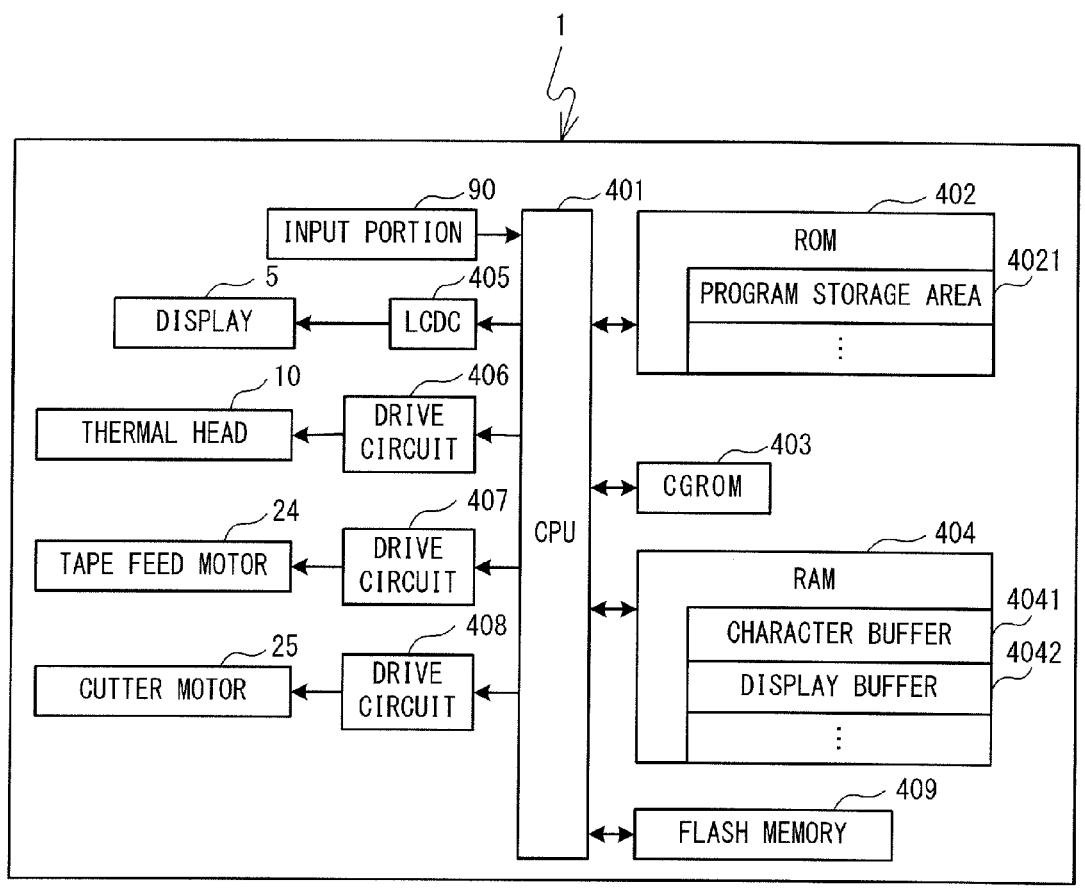
FIG. 3 is a block diagram of an electrical configuration of the printer 1.

An electrical configuration of the printer 1 will be explained with reference to FIG. 3. As shown in FIG. 3, the printer 1 includes a CPU 401, a ROM 402, a CGROM 403, a RAM 404, and a flash memory 409. The CPU 401 controls the individual devices. The ROM 402, the CGROM 403, the RAM 404, and the flash memory 409 are electrically connected to the CPU 401.

The ROM 402 includes at least a program storage area 4021. The program storage area 4021 stores various types of programs and the like that the CPU 401 executes to control the printer 1. The CGROM 403 stores printing dot pattern data and the like for printing the characters.

The RAM 404 includes a character buffer 4041 and a display buffer 4042. The character buffer 4041 temporarily stores print data 91 (refer to FIG. 4) that include data for characters. Hereinafter, the data for characters is referred to as the character data. The display buffer 4042 temporarily stores display data for displaying characters and the like on the display 5. The printer 1 performs printing on the print medium 50 based on the print data 91 that are stored in the character buffer 4041. The printer 1 displays characters and the like on the display 5 based on the display data that are stored in the display buffer 4042. The RAM 404 also stores various other types of data temporarily. The flash memory 409 stores various types of data.

The printer 1 also includes the input portion 90, a liquid crystal drive circuit (LCDC) 405, and drive circuits 406 to 408. The input portion 90, the LCDC 405, and the drive circuits 406 to 408 are electrically connected to the CPU 401. The drive circuit 406 is an electronic circuit for driving the thermal head 10. The drive circuit 407 is an electronic circuit for driving a tape feed motor 24. The tape feed motor 24 may rotate the ribbon winding shaft 9 (refer to FIG. 2) and the tape drive shaft (not shown in the drawings). The drive circuit 408 is an electronic circuit for driving a cutter motor 25. The cutter motor 25 may operate the moving blade that cuts the print medium 50 on which printing has been completed and that is discharged to the outside of the printer 1. The LCDC 405 is an electronic circuit for outputting characters and the like to the display 5.

An example of the print data, examples of images that are displayed on the display 5 based on the print data, and an example of the print medium 50 that has been printed based on the print data and on which printing has been completed will be explained with reference to FIGS. 4 to 11. In the explanation of the present embodiment, the left-right direction in FIGS. 5 to 9 and FIG. 11 is referred to as the arraying direction on the display 5 and the print medium 50. The arraying direction is the direction in which a plurality of blocks 851 to 855 are arrayed. The left side and the right side in FIGS. 5 to 9 and FIG. 11 are referred to as the front end and the back end in the arraying direction, respectively. The top side and the bottom side of FIGS. 5 to 9 are defined as the top side and the bottom side of the display 5, respectively. The top side and the bottom side of FIG. 11 are defined as the top side and the bottom side of the print medium 50, respectively.

Figure 4:
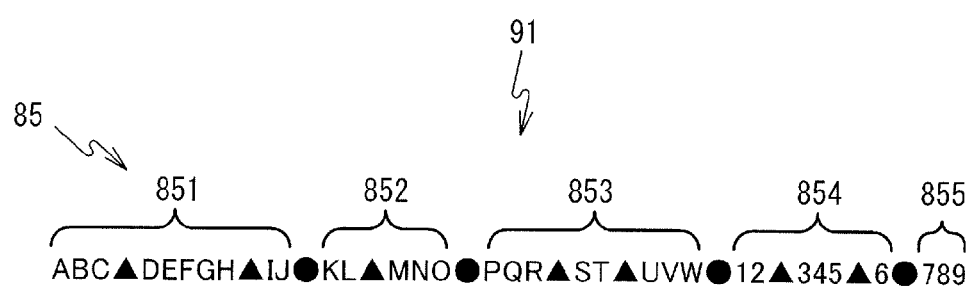
FIG. 4 is a figure that shows print data 91.

The user may input the character data, line break data, block break data, and the like by operating the input portion 90. The print data 91 that are shown in FIG. 4 are data that have been input via the input portion 90 and are stored in the character buffer 4041. The print data 91 include the character data, block data, space data, the line break data, and the block break data. The character data are data for characters such as individual alphabetic letters, symbols, numerals, and the like. The space data are data that indicate a space in a case where a space key has been pressed on the input portion 90. The space data are not included in the print data 91 in FIG. 4.

Figure 16:
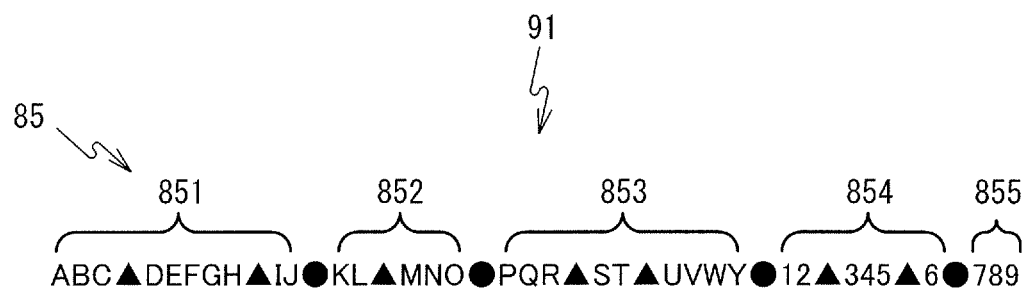
FIG. 16 is a figure that shows a state in which a character "Y" has been added to the print data 91 in FIG. 4.

The line break data are data that indicate a line break in a case where a line break key has been pressed on the input portion 90. In FIGS. 4 and 16, the line break data are indicated by black triangles. The block data are data that configure the blocks 851 to 855 (refer to FIGS. 4, 10, and 11). The block break data are data that indicate the positions of breaks between a plurality of sets of the block data. In FIGS. 4 and 16, the block break data are indicated by black circles. As shown in FIG. 4, the print data 91 are made up of the character data (ABC), the line break data, the character data (DEFGH), the line break data, the character data (IJ), the block break data, the character data (KL), the line break data, the character data (MNO), the block break data, the character data (PQR), the line break data, the character data (ST), the line break data, the character data (UVW), the block break data, the character data (12), the line break data, the character data (345), the line break data, the character data (6), the block break data, and the character data (789).

Figure 5:
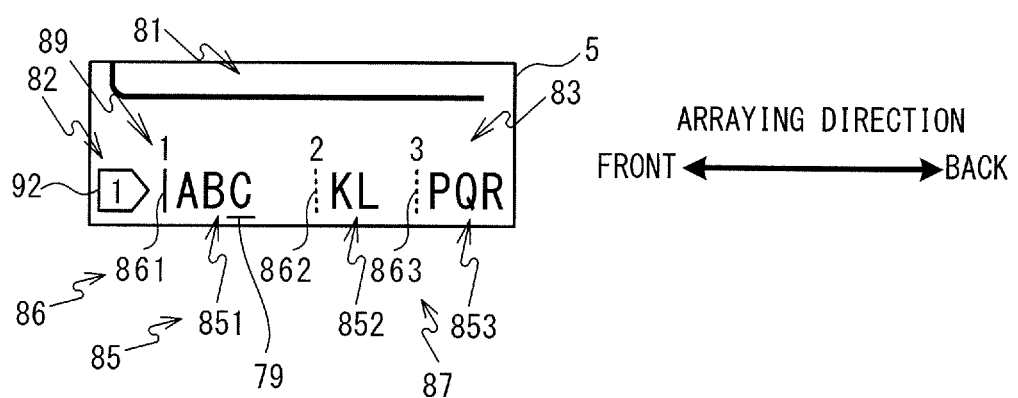
FIG. 5 is a figure that shows an example of display content that is displayed on a display 5.

As shown in FIG. 5, an information display area 81 is provided in the upper part of the display 5. Various types of information are displayed in the information display area 81, such as the length of the print medium 50 that is required in a case where the characters that have currently been input are printed, information for changing the format of the characters (the form or the like of the characters) that have been input, and the like. In FIGS. 5 to 9, the various types of displays that are displayed in the information display area 81 have been omitted.

A display area 82 and a display area 83 are provided below the information display area 81 of the display 5. The display area 82 is disposed at the front end in the arraying direction (the end on the left side in FIG. 5). The display area 83 is disposed at the back side in the arraying direction (the right side in FIG. 5). A line indication 92 is displayed in the display area 82. A line number that corresponds to the line for the characters that are being displayed in the display area 83 is displayed in the line indication 92 (refer to FIGS. 5 to 9, 15, and 17). By checking the line indication 92, the user is able to check the line for the characters that are being displayed in the display area 83.

The characters that have been input, break lines 86 (described below), and the like are displayed in the display area 83. The display area 83 is capable of displaying two lines of characters, one line above the other (refer to FIGS. 5 to 9, 15, and 17). The display area 83 is capable of displaying 14 characters in the arraying direction. Thus, the number of characters that are displayed in the display area 83 is limited. Accordingly, in a case where the print data 91 (refer to FIG. 4) have been input, a portion of the characters and the like, but not all of the characters and the like, may be displayed in the display area 83.

Figure 10:
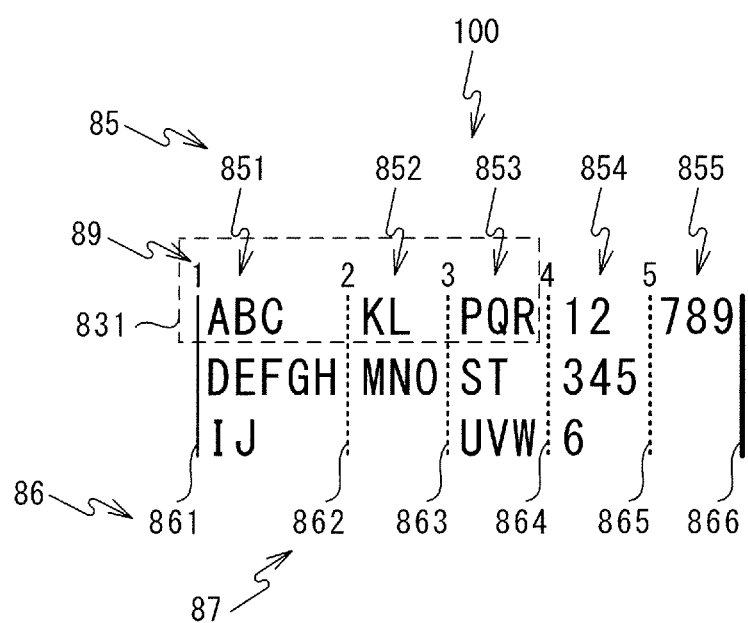
FIG. 10 is a figure that shows a display example 100 in a case where it is assumed that entire display content that corresponds to the print data 91 is displayed.
Figure 11:
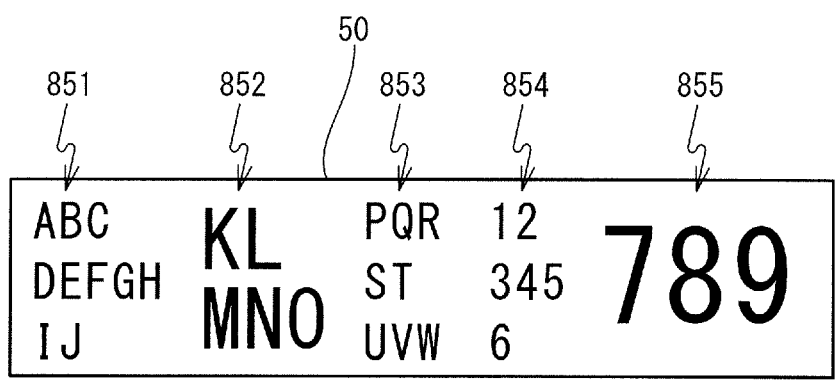
FIG. 11 is a figure that shows a print medium 50 on which printing has been completed.

A display example 100 that is shown in FIG. 10 is an example of a case in which it is assumed that the entire display content that corresponds to the print data 91 is displayed. Actually, only a portion of the display example 100 is displayed on the display 5, and the entire display example 100 is not displayed on the display 5. For example, in the display area 83 that is shown in FIG. 5, the characters in a display range 831 that is indicated by a broken line that is shown in FIG. 10 are displayed.

Various types of display content that are displayed in the display area 83 will be explained with reference to FIGS. 5 to 10. As shown in FIGS. 5 to 10, the blocks 851 to 855 that contain the characters, block break lines 862 to 865, a front end break line 861, a back end break line 866, block numbers 89, the cursor 79, and the like are displayed in the display area 83. In the explanation that follows, in a case where the blocks 851 to 855 are referenced collectively, as well as in a case where no single one of the blocks is specified, the blocks 851 to 855 are referred to as the blocks 85. In a case where the block break lines 862 to 865, the front end break line 861, and the back end break line 866 are referenced collectively, as well as in a case where no single one of the break lines is specified, the block break lines 861 to 866 are referred to as the break lines 86. In a case where the block break lines 862 to 865, as well as in a case where no single one of the block break lines 862 to 865 is specified, the block break lines 862 to 865 are referred to as the block break lines 87.

The block numbers 89 express the sequence numbers of the blocks 85. In the display example that is shown in FIG. 10, the block number 89 of the front end block 851 in the arraying direction is "1", and the block number 89 of the back end block 855 in the arraying direction is "5". The break lines 86 are line segments that extend in a direction that is orthogonal to the arraying direction (that is, in the up-down direction).

The block break lines 87 are line segments that indicate the positions of the breaks between the blocks. The block break lines 87 are broken lines. The block break lines 87 are displayed in a case where the line break data are present in the print data 91. Among the block break lines 87, the block break line 862 is displayed between the block 851 and the block 852. The block break line 863 is displayed between the block 852 and the block 853. The block break line 864 is displayed between the block 853 and the block 854. The block break line 865 is displayed between the block 854 and the block 855.

The front end break line 861 is displayed in front of the front end block 851 in the arraying direction. In other words, the front end break line 861 is a line segment that indicates the position of the front end of the print data 91. The front end break line 861 is a solid line. The back end break line 866 is displayed after the back end block 855 in the arraying direction. In other words, the back end break line 866 is a line segment that indicates the position of the back end of the print data 91. The back end break line 866 is a solid line that is thicker than the front end break line 861.

The cursor 79 is a line segment that extends in the arraying direction. The character data, the space data, the line break data, the block break data, and the like are input at the position where the cursor 79 is displayed in accordance with a command that is input from the input portion 90. The user may move the cursor 79 by operating the cursor key 41 of the input portion 90. In a case where the cursor 79 is moved to the position of one of the break lines 86, the cursor 79 is displayed at one of the upper end side and the lower end side of the break line 86 (the lower end side in the present embodiment).

When the characters are printed on the print medium 50 based on the print data 91 that are shown in FIG. 4, the print medium 50 on which printing has been completed is formed, as shown in FIG. 11. In this case, as shown in FIG. 11, the characters are printed on the print medium 50 such that the blocks 851 to 855 are arrayed in the arraying direction. To the extent that the number of lines in any one of the blocks 851 to 855 increases, the size of the characters becomes smaller. The break lines 86 are not printed.

Figure 12:
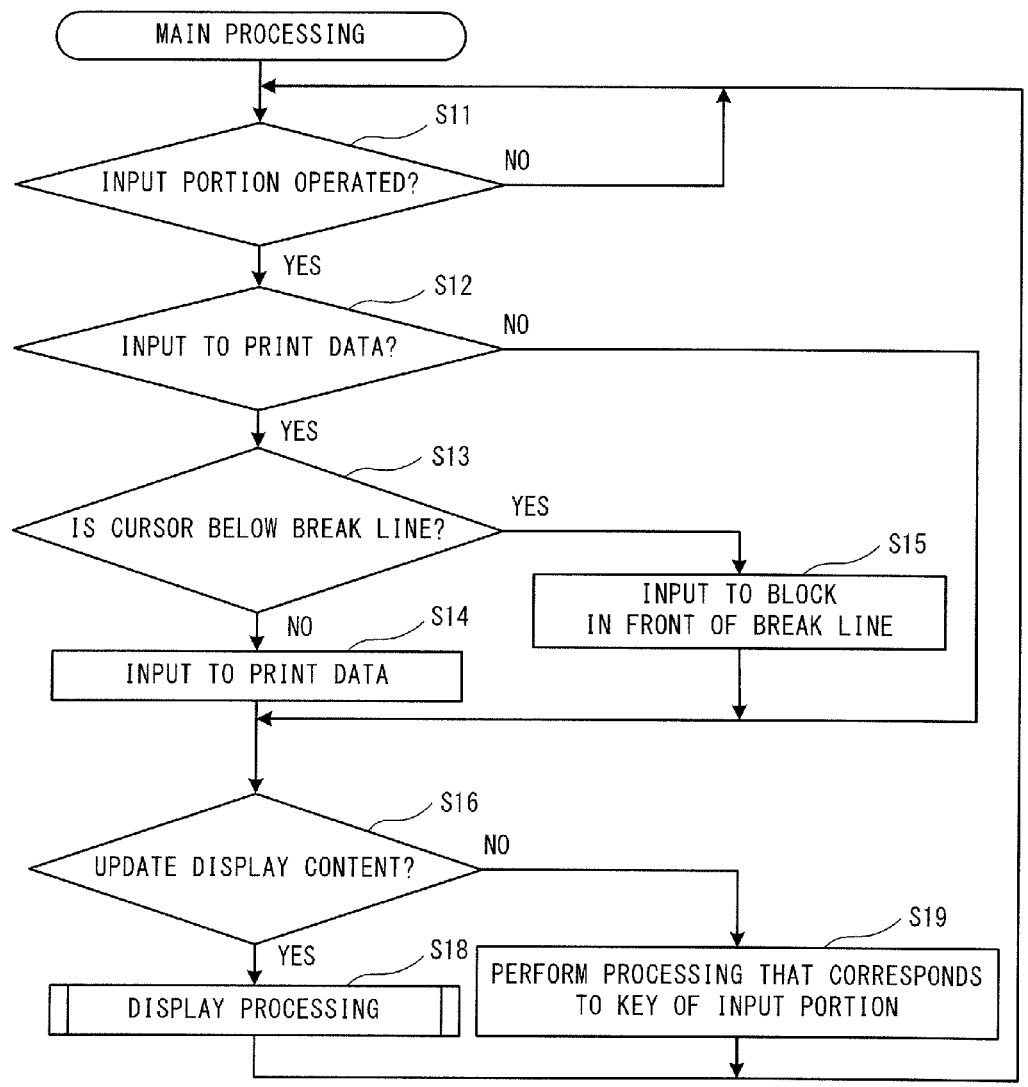
FIG. 12 is a flowchart of main processing.

Main processing by the CPU 401 of the printer 1 will be explained with reference to FIGS. 12 to 14. As shown in FIG. 12, when the power supply for the printer 1 is turned on, the CPU 401 reads a program for the main processing from the program storage area 4021 and performs the main processing. First, a determination is made as to whether the input portion 90 has been operated (Step S11). In a case where the input portion 90 has not been operated (NO at Step S11), the processing at Step S11 is repeated. In a case where the input portion 90 has been operated (YES at Step S11), a determination is made as to whether data is to be input to the print data (Step S12). For example, in a case where it was detected at Step S11 that a character input key had been operated, the CPU 401 determines that the character data is to be input to the print data (YES at Step S12).

If data is not to be input to the print data (NO at Step S12), the CPU 401 performs the processing at Step S16, which will be described below. If data is to be input to the print data (YES at Step S12), the CPU 401 determines whether the cursor 79 is below one of the break lines 86 (Step S13). If the cursor 79 is not below one of the break lines 86 (NO at Step S13), the data (the character data, the space data, the line break data, the block break data, or the like) are input to the print data in the position of the cursor 79 and are stored in the character buffer 4041 (Step S14). Next, the processing at Step S16 (described below) is performed. If the cursor 79 is below one of the break lines 86 (YES at Step S13), the data (the character data, the space data, the line break data, the block break data, or the like) are input to the print data in the block that is in front of the break line 86 and are stored in the character buffer 4041 (Step S15).

Next, a determination is made as to whether the display content on the display 5 is to be updated (Step S16). At Step S16, in a case where it is necessary to update the display content on the display 5 according to a command that was input at Step S11, the determination is made that the display content is to be updated (YES at Step S16). For example, in a case where a character input key has been operated (YES at Step S11), the character that has been input is to be displayed on the display 5, so the determination is made that the display content on the display 5 is to be updated. In a case where the cursor key 41 has been pressed, the cursor 79 is to be moved, so the determination is made that the display content on the display 5 is to be updated. In a case where the cursor key 41 has been operated and it is necessary to scroll the display content, the characters and the like is to be moved, so the determination is made that the display content on the display 5 is to be updated.

If the display content on the display 5 is not to be updated (NO at Step S16), processing is performed that corresponds to the key on the input portion 90 that was operated at Step S11 (Step S19). For example, in a case where the Print key has been operated, processing that performs the printing is performed (Step S19). That causes the print medium 50 on which printing has been completed to be formed, as shown in FIG. 11. Next, the processing returns to Step S11. If the display content on the display 5 is to be updated (YES at Step S16), display processing is performed (Step S18).

The display processing will be explained with reference to FIG. 13. The display processing is processing that displays characters and the like on the display 5 based on the print data that are stored in the character buffer 4041. In the explanation that follows, a case in which the print data 91 that are shown in FIG. 4 have been stored in the character buffer 4041 and the image that is shown in FIG. 5 is displayed on the display 5 will be explained as an example.

First, a display start position, which is the position in the print data 91 from which the display on the display 5 is to start, is acquired from the print data 91 that are stored in the character buffer 4041 (Step S21). Next, the number of characters' worth of the data (the character data and the like) in the print data 91 that is to be displayed on the display 5, starting from the display start position, is stored in the display buffer 4042 (Step S22). At this time, the space data are inserted as appropriate. For example, the second line of the block 851 that is shown in FIG. 10 is made up of the five characters "DEFGH". In contrast, the first line is made up of the three characters "ABC". Therefore, in the display example 100 in FIG. 10, two characters' worth of the space data have been inserted following "ABC". In the explanation that follows, the data that are stored in the display buffer 4042 is referred to as the display data.

Next, a determination is made as to whether the front end of the front end block 851 is to be displayed (Step S23). If the front end of the front end block 851 is not to be displayed (NO at Step S23), the processing advances to Step S25. In a case where the display range 831 (refer to FIG. 10) is to be displayed, for example, the front end of the front end block 851 is to be displayed. If the front end of the front end block 851 is to be displayed (YES at Step S23), data for displaying the front end break line 861 are inserted into the display data (Step S24).

Next, a determination is made as to whether the back end of the back end block 855 is to be displayed (Step S25). If the display range 831 (refer to FIG. 10) is to be displayed, for example, the back end of the back end block 855 is not to be displayed. If the back end of the back end block 855 will not be displayed (NO at Step S25), the processing advances to Step S27. In a case where the back end of the back end block 855 is to be displayed (YES at Step S25), data for displaying the back end break line 866 are inserted into the display data (Step S26).

Next, the CPU 401 determines whether the block number 89 is to be displayed (Step S27). For example, in a case where the position of the cursor 79 is in the first line, the CPU 401 determines that the block number 89 is to be displayed (YES at Step S27). If the block number 89 is not to be displayed (NO at Step S27), the CPU 401 performs the processing at Step S29 (described below). If the block number 89 is to be displayed (YES at Step S27), the CPU 401 performs first block number adding processing (Step S28).

The first block number adding processing will be explained with reference to FIG. 14. In the first block number adding processing, a determination is made as to whether data for displaying the break line 86 in front of the foremost block 85 (the block 85 that is the farthest toward the front end) exist within the display data (Step S41). If the data for displaying the break line 86 in front of the foremost block 85 do exist within the display data (YES at Step S41), data for displaying the block number 89 are added to the display data so that the block number 89 may be displayed above the break line 86 (Step S42). For example, in a case where the display range 831 (refer to FIG. 10) is to be displayed, the data for displaying the front end break line 861 are inserted into the display data (Step S24). Therefore, the determination is made that the data for displaying the break line 86 in front of the foremost block 851 exist within the display data (YES at Step S41). Accordingly, the data for displaying "1" as the block number 89 that expresses the sequence number of the block 851 are added to the display data.

If the data for displaying the break line 86 in front of the foremost block 85 do not exist within the display data (NO at Step S41), data for displaying the block number 89 are added to the display data so that the block number 89 may be displayed at the front end of the display area 83 (refer to FIG. 5) (Step S43). After processing at one of Steps S42 and S43 has been executed, a determination is made as to whether data exist for displaying one of the break lines 86 other than the break line 86 in front of the foremost block 85 (Step S44). The break line 86 other than the break line 86 in front of the foremost block 85 is hereinafter referred to as the other break line 86.

If the data for displaying the other break line 86 do not exist (NO at Step S44), the first block number adding processing is terminated. If the data for displaying the other break line 86 do exist (YES at Step S44), the data for displaying the block number 89 are added to the display data so that the block number 89 may be displayed above the other break line 86 (Step S45). For example, in a case where the display range 831 (refer to FIG. 10) is to be displayed, the display data include the block break data for displaying the block break lines 862, 863. Therefore, the determination is made that the data exist for displaying the other break line 86 (YES at Step S44). Accordingly, the data for displaying "2" and "3" as the block numbers 89 are added to the display data (Step S45). Next, the first block number adding processing is terminated, and the processing returns to the display processing (refer to FIG. 13).

Figure 13:
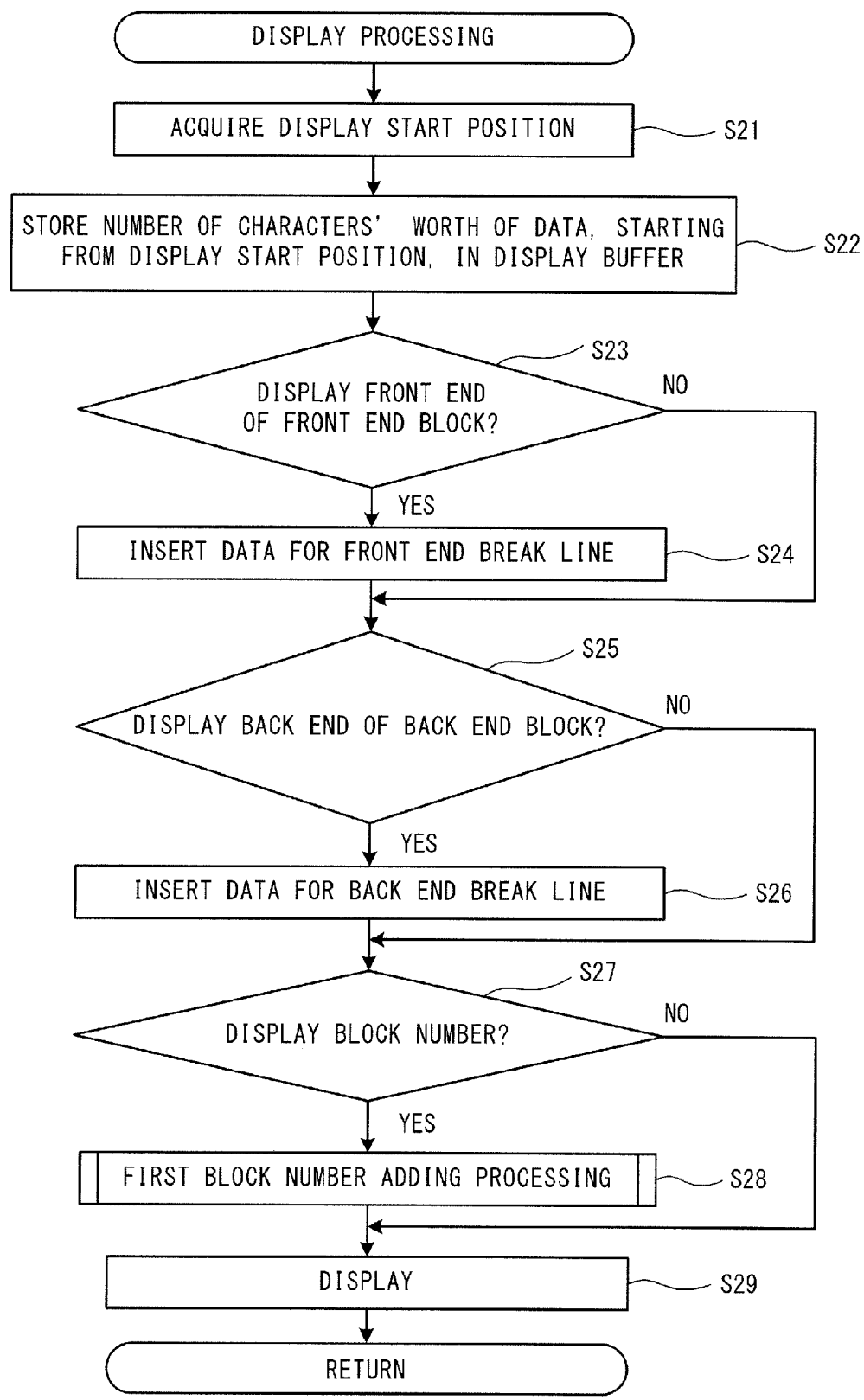
FIG. 13 is a flowchart of display processing.

Next, as shown in FIG. 13, an image is displayed on the display 5 based on the display data that have been stored in the display buffer 4042 (Step S29). The image that is shown in FIG. 5, for example, may thus displayed on the display 5. As shown in FIG. 5, the blocks 851 to 853 are displayed on the display 5. "1" is displayed as the block number 89 above the front end break line 861. "2" and "3" are displayed as the block numbers 89 above the block break lines 862, 863, respectively. Next, the display processing is terminated, and the processing returns to Step S11 of the main processing (refer to FIG. 12).

The display processing (Step S18) is performed every time the user operates the cursor key 41 of the input portion 90 (YES at Step S11), for example. That causes the position of the cursor 79 to be moved, for example, and causes the characters that are displayed in the display area 83 to be moved. For example, when the display content that is shown in FIG. 5 is being displayed on the display 5, if the user operates the cursor key 41 to move the cursor 79 to the position of the block break line 864 on the first line, the display processing (Step S18) is repeated every time the cursor key 41 is operated. That causes the display content that is shown in FIG. 6 to be displayed on the display 5 (Step S29).

Figure 6:
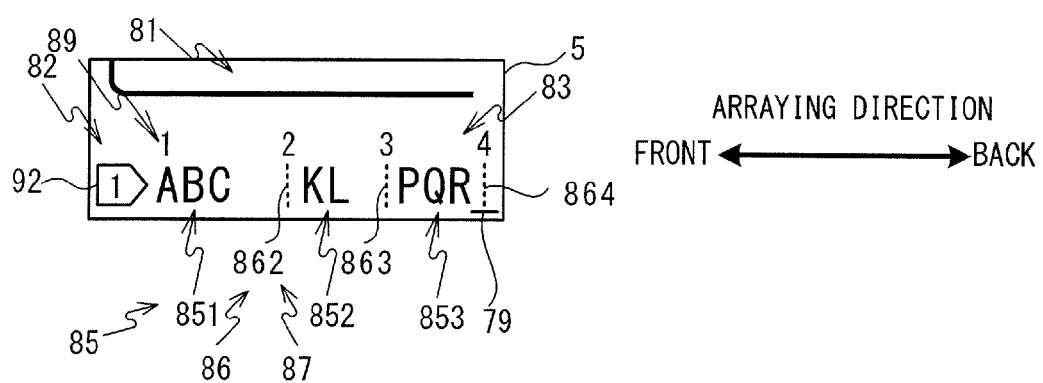
FIG. 6 is a figure that shows another example of the display content that is displayed on the display 5.

In FIG. 6, unlike in FIG. 5, the characters and the like (that is, the display content) that are displayed in the display area 83 are displayed on the display 5 by being scrolled toward the front in the arraying direction. In FIG. 6, the break line 86 that is in front of the foremost block 851 is not shown. Therefore, at Step S41 in FIG. 14, the determination is made that the data for displaying the break line 86 in front of the front end block 851 do not exist within the display data (NO at Step S41). Accordingly, the block number is added to the display data so that the block number 89 "1" is to be displayed at the front end of the display area 83 (refer to FIG. 5) (Step S43). Therefore, the block number 89 "1" is displayed above the character "A" at the front end of the display area 83. In other words, in FIG. 6, the block number 89 "1" that had been displayed above the front end break line 861 (refer to FIG. 5) is displayed on the display 5 such that the block number 89 "1" is moved in the arraying direction in relation to the foremost block 851 (the farthest toward the front end).

Figure 7:
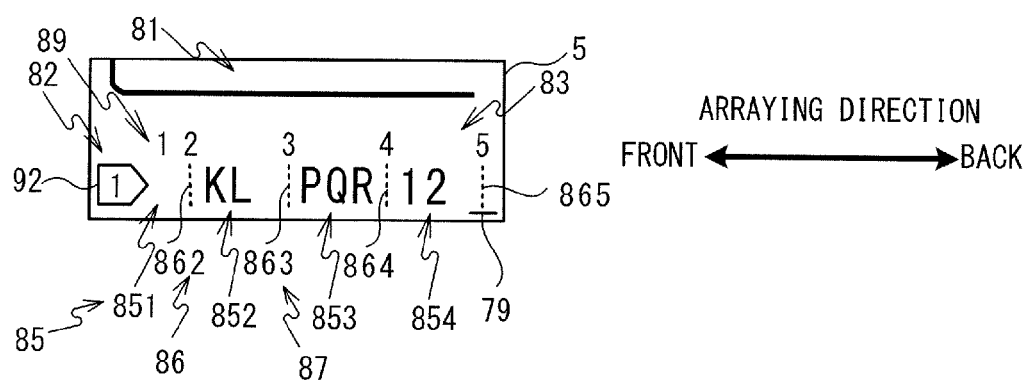
FIG. 7 is a figure that shows another example of the display content that is displayed on the display 5.
Figure 8:
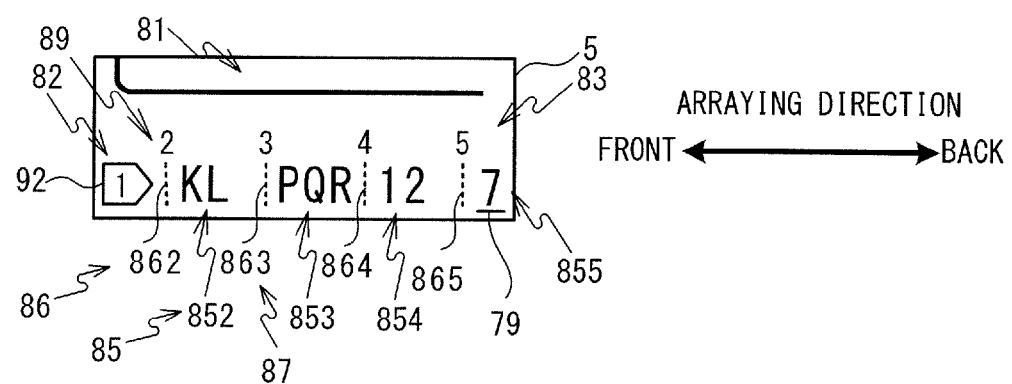
FIG. 8 is a figure that shows another example of the display content that is displayed on the display 5.
Figure 9:
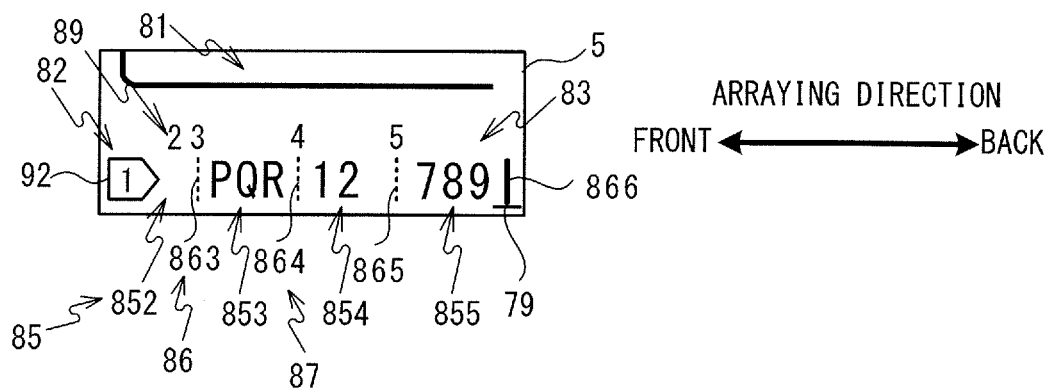
FIG. 9 is a figure that shows another example of the display content that is displayed on the display 5.

When the cursor 79 is moved farther toward the back, the block number 89 "1" moves in relation to the block 851 for as long as the block 851 is displayed. For example, in a case where the rearmost one of the two spaces that follow the character "C" in the block 851 is displayed at the front end of the display area 83, as shown in FIG. 7, the block number 89 "1" is displayed above that space. Then, when the display content is scrolled farther toward the front and the block 851 is no longer shown in the display 5, the block number 89 "1" ceases to be displayed (refer to FIG. 8). In the same manner, when the display content is scrolled farther toward the front, the block number 89 "2" is displayed such that the block number 89 "2" is moved in relation to the block 852, as shown in FIG. 9.

In this manner, in a case where the display content on the display 5 is scrolled, the block number 89 at the front end is displayed for as long as the corresponding foremost block 85 that is displayed in the display area 83 is displayed. Therefore, during the scrolling, the block number 89 does not cease to be displayed while the corresponding foremost block 85 is being displayed (refer to FIGS. 5 to 9). The user can thereby easily determine which of the blocks 85 are being displayed on the display 5.

Figure 15:
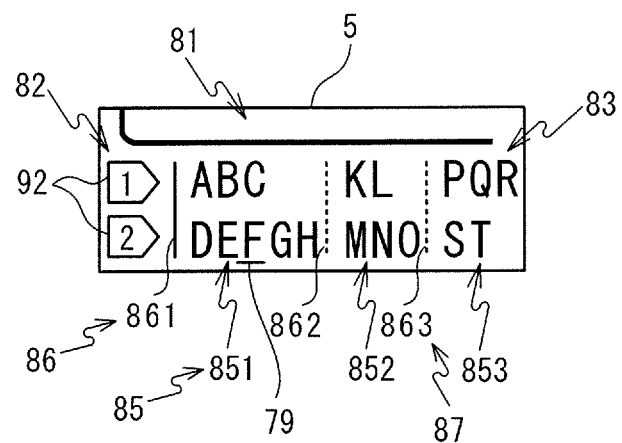
FIG. 15 is a figure that shows another example of the display content that is displayed on the display 5.

When the cursor 79 is positioned below the character "C", for example, as shown in FIG. 5, if the user operates the cursor key 41 to perform an operation that moves the cursor 79 to the position of the character "F" on the second line (refer to FIG. 10), the image that is shown in FIG. 15 is displayed on the display 5 by the display processing (Step S18). Because the position of the cursor 79 is not in the first line, the determination is made that the block numbers 89 is not to be displayed (NO at Step S27 in FIG. 13). Accordingly, the first block number adding processing (Step S28) is not performed. Therefore, the block numbers 89 are not displayed in FIG. 15.

A case in which a character is input to the print data 91 will be explained. When the cursor 79 is positioned below the character "C", for example, as shown in FIG. 5, if an operation is performed to input a character "X" (YES at Step S11 in FIG. 12), the determination is made that the cursor 79 is not below any of the break lines 86 (NO at Step S13). Then the character data for "X" is input between the character data for "B" and the character data for "C" in the print data 91 (Step S14). The character "X" is also added to and displayed on the display 5 (Step S18), although that is not shown in the drawings.

Figure 17:
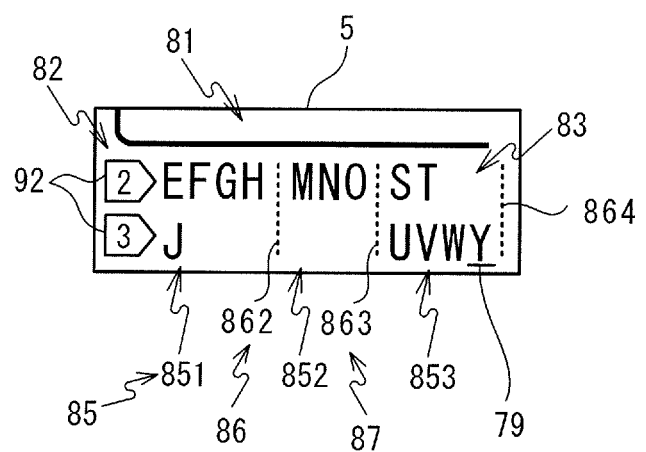
FIG. 17 is a figure that shows the display content on the display 5 in the state in which the character "Y" has been added.

When the cursor 79 is positioned below the block break line 864, for example, as shown in FIG. 6, if an operation is performed to input a character "Y" (YES at Step S11 in FIG. 12), the determination is made that the cursor 79 is below one of the break lines 86 (YES at Step S13). Then, as shown in FIG. 16, the character data for "Y" is input to the block 853 that is in front of the block break data that correspond to the block break line 864 in the print data 91 (Step S15). Then the character "Y" is displayed in the block 853 in front of the block break line 864, as shown in FIG. 17 (Step S18). As is also shown in FIG. 17, the cursor 79 is positioned below the character "Y". Because the position of the cursor 79 is not in the first line, the determination is made that the block numbers 89 is not to be displayed (NO at Step S27). Accordingly, the first block number adding processing (Step S28) is not performed. Therefore, the block numbers 89 are not displayed, as shown in FIG. 17.

In the present embodiment, the cursor 79 may be displayed at one end side (the lower end side in the present embodiment), in relation to the block break line 87, in the direction (the up-down direction in FIGS. 5 to 9) that is orthogonal to the arraying direction (refer to FIG. 7). Therefore, the cursor 79 can be displayed by utilizing the spaces in the arraying direction that are for displaying the block break lines 87. In a case where a command to input a character is input via the input portion 90 in a state in which the cursor 79 is being displayed below one of the block break lines 87 (in FIG. 12, YES at Step S11; YES at Step S12; YES at Step S13), the character data can be input to the block 85 that is in front of the block break line 87 (refer to FIGS. 12 (Step S15), 16, and 17). Accordingly, the number of characters in the display content that is displayed in the arraying direction can be increased from what it would be in a case where a space is provided in front of the block break line 87 in order for the character data to be input to the block in front of the block break line 87, with the cursor 79 being disposed in that space. The display area 83 of the display 5 can thus be utilized more effectively.

The direction in which the block break line 87 extends is orthogonal to the direction in which the cursor 79 extends. Therefore, the user can more easily distinguish the cursor 79 from the block break line 87 than in a case where the block break line 87 and the cursor 79 both extend in the same direction. It is thus possible to prevent the cursor 79 and the block break line 87 from overlapping and making the position of the cursor 79 harder to discern.

In the present embodiment, the block break lines 87 and the block numbers 89 may be displayed on the display 5. The user can therefore easily determine which of the blocks 85 are being displayed on the display 5. It is therefore possible to prevent the user from misapprehending the block on which editing is to be performed.

The front end break line 861 and the back end break line 866 are displayed as solid lines (refer to FIGS. 5 and 9). In contrast, the block break lines 87 are displayed as broken lines. In other words, the displaying of the front end break line 861 and the back end break line 866 is different from the displaying of the block break lines 87. The user is therefore easily able to distinguish the front end break line 861 and the back end break line 866 from the block break lines 87. Accordingly, in a case where one of the block break lines 87 is displayed on the display 5, for example, the user can easily determine the blocks 85 are located in front of and in back of the block break line 87. In a case where the front end break line 861 is displayed, the user can easily determine that the position of the front end break line 861 is at the front end of the front end block 851. In a case where the back end break line 866 is displayed, the user can easily determine that the position of the back end break line 866 is at the back end of the back end block 855.

The front end break line 861 is a solid line. The back end break line 866 is a solid line that is thicker than the front end break line 861. In other words, the front end break line 861 and the back end break line 866 are displayed differently. The user can therefore clearly distinguish between the front end break line 861 and the back end break line 866. In a case where, for example, display content that is based on print data that are different from the print data 91 is displayed following the back end break line 866 of the display content that is based on the print data 91, the front end break line 861 that is based on the print data that are different from the print data 91 is displayed following the back end break line 866 of the display content that is based on the print data 91. Therefore, the user can easily confirm the position of the break between the display content that is based on the print data 91 and the following display content that is based on print data that are different from the print data 91.

The present disclosure is not limited to the embodiment that is described above, and various types of modifications can be made. For example, in a case where the display content on the display 5 is scrolled, while the foremost block 85 is being displayed in the display area 83, it is acceptable for the block number 89 that is at the front end not to be displayed such that the block number 89 is moved in relation to the front end block 85.

The cursor 79 may be displayed at one end side (the lower end side in the present embodiment), in relation to the block break line 87, in the direction (the up-down direction in FIGS. 5 to 9) that is orthogonal to the arraying direction (refer to FIG. 7). However, the cursor 79 may be a line segment that extends in the up-down direction. The block break line 87 and the cursor 79 may be displayed parallel to one another.

In a case where a command to input a character is input via the input portion 90 in a state in which the cursor 79 is being displayed below one of the block break lines 87 (YES at Step S11 in FIG. 12), the character may be input to the block 85 that is in back of the block break line 87.

The front end break line 861, the back end break line 866, and the block break lines 87 may be displayed in different forms from the break lines that are used as examples in the embodiment that is described above. For example, the front end break line 861, the back end break line 866, and the block break lines 87 may all be displayed in the same form. It is acceptable for the front end break line 861 and the back end break line 866 not to be displayed, for example.

The orientation of the block numbers 89 is not restricted. For example, the block numbers 89 may be rotated 90 degrees. Instead of being displayed above the break lines 86, the block numbers 89 may be displayed in the center of the arraying direction for each one of the blocks 85. Hereinafter, a modified example will be explained in which the block numbers 89 are rotated 90 degrees and each one of the block numbers 89 is displayed in the center of the arraying direction for the corresponding block 85.

Figure 18:
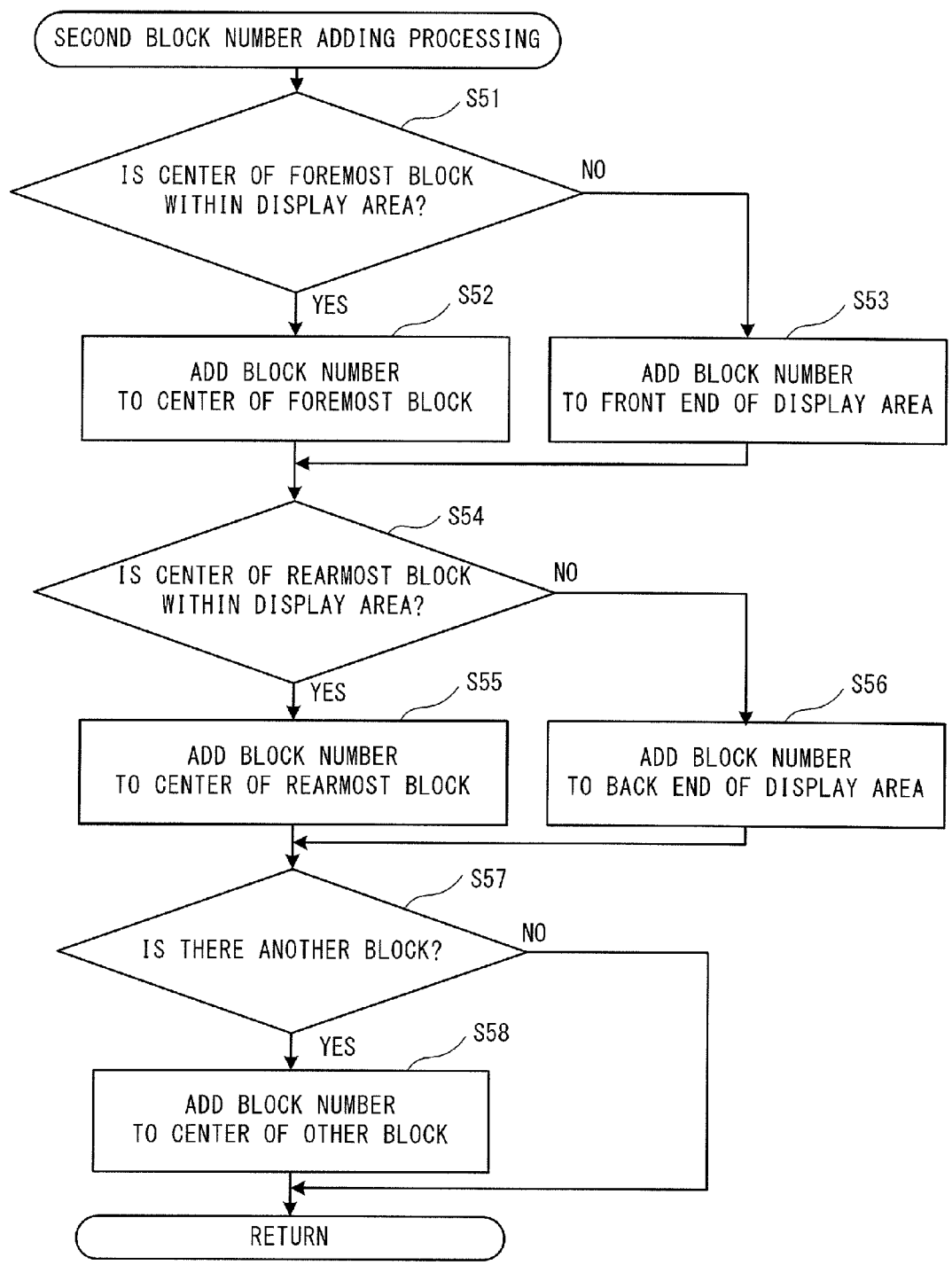
FIG. 18 is a flowchart of second block number adding processing.

In the embodiment that is described above, the first block number adding processing (refer to FIG. 14) is performed at Step S28 (refer to FIG. 13). In the modified example, second block number adding processing that is shown in FIG. 18 is performed at Step S28. The rest of the processing is the same as in the embodiment that is described above, so explanations will be omitted.

As shown in FIG. 18, in the second block number adding processing, a determination is made as to whether a center position in the arraying direction (hereinafter simply referred to as the center position) of the foremost block 85 (the block 85 that is the farthest toward the front end) within the display data is located within the display area 83 (Step S51). If the center position of the foremost block 85 within the display data is located within the display area 83 (YES at Step S51), the data for displaying the block number 89 are added to the display data such that the corresponding block number 89 is to be displayed above the center position of the foremost block 85 (Step S52).

For example, in a case where the characters "ABC", "KL", and "PQR" within the display range 831 that is shown in FIG. 10 is to be displayed, the display data contain the character "C", which is in the center position of the foremost block 851. Therefore, the determination is made that the center position of the foremost block 851 in the display data is located within the display area 83 (YES at Step S51). Accordingly, the data for displaying the block number 89 "01" above the character "C", which is in the center position of the block 851, are added to the display data (Step S52). At this time, the data are added to the display data such that the block number 89 is to be rotated 90 degrees when the block number 89 is displayed (the same is done in the processing at Steps S53, S55, S56, and S58).

Figure 14:
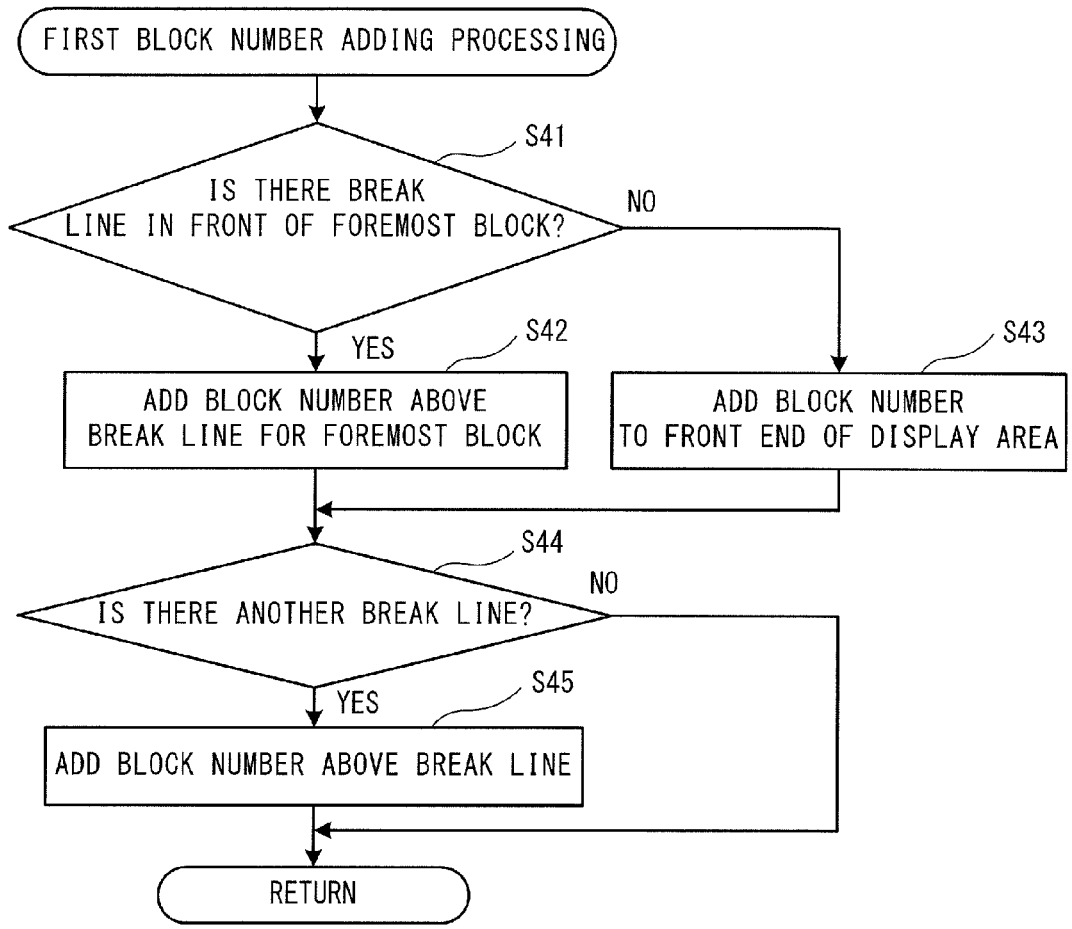
FIG. 14 is a flowchart of first block number adding processing.

If the center position of the foremost block 85 in the display data is not located within the display area 83 (NO at Step S51), the data for displaying the block number 89 are added to the display data, in the same manner as in the processing at Step S43 in FIG. 14, such that the block number 89 is to be displayed at the front end of the display area 83 (Step S53).

After one of Steps S52 and S53 is executed, a determination is made as to whether the center position of the rearmost block 85 (the block 85 that is the farthest toward the back end) within the display data is located within the display area 83 (Step S54). If the center position of the rearmost block 85 within the display data is located within the display area 83 (YES at Step S54), the data for displaying the block number 89 are added to the display data such that the corresponding block number 89 is to be displayed above the center position of the rearmost block 85 (Step S55).

For example, the rearmost block in the display data for displaying the characters "ABC", "KL", and "PQR" within the display range 831 that is shown in FIG. 10 is the block 853. The display data contain the character "Q", which is located in the center position of the block 853. Therefore, the determination is made that the center position of the rearmost block 853 in the display data is located within the display area 83 (YES at Step S54). Accordingly, the data for displaying the block number 89 "03" above the character "Q" that is in the center position of the block 853 are added to the display data (Step S55).

If the center position of the rearmost block 85 in the display data is not located within the display area 83 (NO at Step S54), the data for displaying the block number 89 are added to the display data such that the block number 89 is to be displayed at the back end of the display area 83 (Step S56).

After processing at one of Steps S55 and S56 is executed, a determination is made as to whether data for displaying one of the blocks 85 other than the foremost block 85 and the rearmost block 85 exist within the display data (Step S57). The block 85 other than the foremost block 85 and the rearmost block 85 is hereinafter referred to as the other block 85. If the data for displaying the other block 85 do not exist within the display data (NO at Step S57), the second block number adding processing is terminated. If the data for displaying the other block 85 do exist within the display data (YES at Step S57), the data for displaying the block number 89 are added to the display data so that the block number 89 is to be displayed above the center position of the other block 85 (Step S58). For example, in the case where the characters "ABC", "KL", and "PQR" within the display range 831 (refer to FIG. 10) is to be displayed, the other block 852 exists. Therefore, the determination is made that the data for displaying the other block 852 exist (YES at Step S57). Accordingly, the data for displaying the block number 89 "02" above the character "L" that is in the center position of the other block 852 are added to the display data (Step S58). Next, the second block number adding processing is terminated, and the processing returns to the display processing (refer to FIG. 13).

Figure 19:
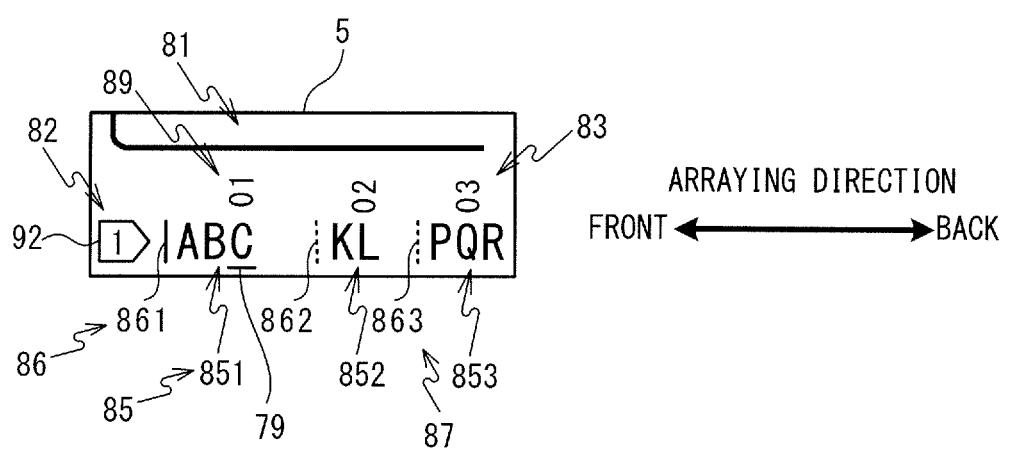
FIG. 19 is a figure that shows an example of the display content that is displayed on the display 5 according to a modified example.

Next, an image is displayed on the display 5 based on the display data that have been stored in the display buffer 4042 (Step S29). The image that is shown in FIG. 19, for example, may thus be displayed on the display 5. As shown in FIG. 19, the blocks 851 to 853 may be displayed on the display 5. The block numbers 89 "01", "02", and "03" may be displayed above the characters in the center positions of the blocks 851 to 853, respectively. Next, the display processing is terminated, and the processing returns to Step S11 of the main processing (refer to FIG. 12).

The display processing at Step S18 is performed every time the user operates the cursor key 41 of the input portion 90 (YES at Step S11), for example. That may cause the position of the cursor 79 to be moved, for example, and may cause the characters that are displayed in the display area 83 to be moved. For example, when the display content that is shown in FIG. 19 is being displayed on the display 5, if the user operates the cursor key 41 to move the cursor 79 to the position below the back end break line 866, the display processing (Step S18) is repeated every time the cursor key 41 is operated. That may cause the display content that is shown in FIG. 20 to be displayed on the display 5 (Step S29).

Figure 20:
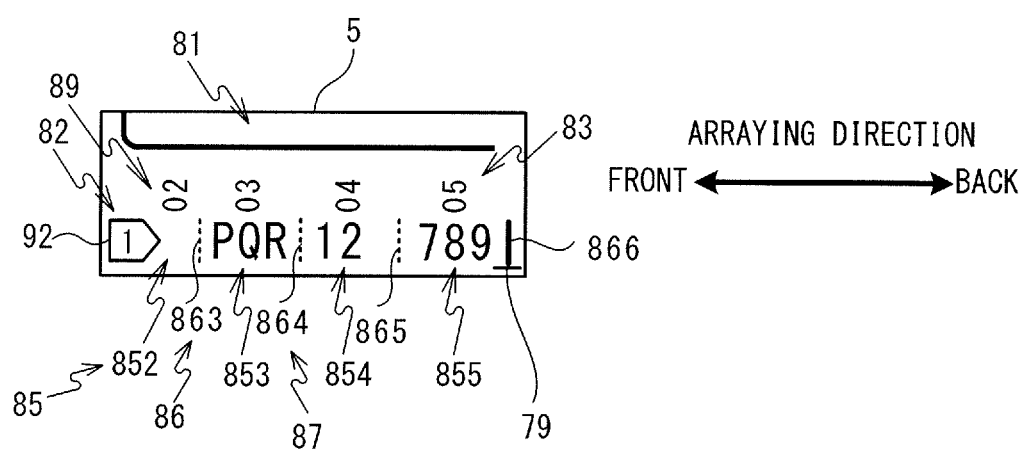
FIG. 20 is a figure that shows another example of the display content that is displayed on the display 5 according to the modified example.

In FIG. 20, unlike in FIG. 19, the characters and the like (that is, the display content) that are displayed in the display area 83 are displayed on the display 5 by being scrolled toward the front in the arraying direction. In FIG. 20, the character "L" that is in the center position of the foremost block 852 (refer to FIG. 10) is not displayed. Therefore, at Step S51, the determination is made that the center position of the foremost block 852 within the display data is not located within the display area 83 (NO at Step S51). Accordingly, the data for displaying the block number 89 are added to the display data such that the block number 89 "02" is to be displayed at the front end of the display area 83 (Step S53). Therefore, the block number 89 "02" is to be displayed above the space that follows the character "L". In other words, in a case where the display content has been scrolled, the block number 89 "02" that had been displayed above the center position of the block 852 (refer to FIG. 19) is displayed on the display 5 such that the block 852 is moved in relation to the block 852.

Figure 21:
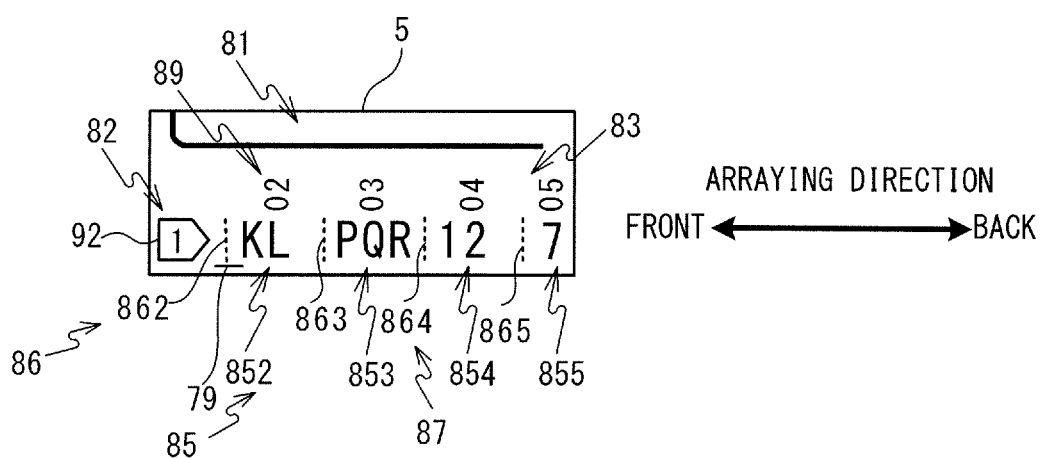
FIG. 21 is a figure that shows another example of the display content that is displayed on the display 5 according to the modified example.

When the display content that is shown in FIG. 20 is being displayed on the display 5, if the user operates the cursor key 41 to move the cursor 79 to the position below the block break line 862, the display content that is shown in FIG. 21 may be displayed on the display 5 (Step S29 in FIG. 13). In FIG. 21, unlike in FIG. 20, the display content that is displayed on the display 5 by being scrolled toward the back in the arraying direction. In FIG. 21, the character "8", which is in the center position of the rearmost block 855, is not displayed. Therefore, at Step S54 in FIG. 18, the determination is made that the center position of the rearmost block 855 within the display data is not located within the display area 83 (NO at Step S54). Accordingly, the data for displaying the block number 89 are added to the display data such that the block number 89 "05" is to be displayed at the back end of the display area 83 (Step S56). Therefore, the block number 89 "05" is to be displayed above the character "7", which is the character in front of the character "8". In other words, in a case where the display content has been scrolled, the block number 89 "05" that had been displayed above the center position of the block 855 is displayed on the display 5 such that the block 855 is moved in relation to the block 855.

In this manner, in a case where the display content on the display 5 is scrolled, for as long as the foremost block 85 that is displayed on the display area 83 in the arraying direction is displayed, the corresponding front end block number 89 is displayed such that the front end block number 89 is moved in relation to the block 85. For as long as the rearmost block 85 that is displayed on the display area 83 in the arraying direction is displayed, the corresponding back end block number 89 is displayed such that the back end block number 89 is moved in relation to the block 85. Therefore, during the scrolling, while one of the block 85 that is the farthest to the front end in the display data and the block 85 that is the farthest to the back end in the display data is being displayed, the corresponding block number 89 does not cease to be displayed (refer to FIGS. 19 to 21). The user can thereby easily determine which of the blocks 85 are being displayed on the display 5.

In the modified example, in a case where the center position of one of the blocks 85 within the display data is located within the display area 83, the corresponding block number 89 is displayed above the center position of the block 85. Therefore, by checking the positions of the block numbers 89, the user can easily determine the center position of each of the blocks 85.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A printer that is configured to print on a tape-type print medium, the printer comprising:
   a processor; and
   a memory configured to store computer-readable instructions that instruct the printer to perform a process comprising:
   displaying, on a display portion, characters, a block break line, and block numbers in a case where print data include block data and block break data, the block break line being a line segment that indicates a break position between adjacent blocks of a plurality of blocks, each of the plurality of blocks containing at least one line's worth of characters, the block numbers indicating sequence numbers for the plurality of blocks, the block data being data for the plurality of blocks, the block break data being data that indicate the break position, and the plurality of blocks being to be printed in a first direction in which the plurality of blocks are arrayed; and displaying, on the display portion, display content that is based on the print data, by scrolling the display content in the first direction, wherein the displaying, on the display portion, the characters, the block break line, and the block numbers includes, in a case where the display content is scrolled, while one of a foremost block and a rearmost block among the plurality of blocks is being displayed, displaying, on the display portion, a block number of the one of the foremost block and the rearmost block by moving the block number in relation to the one of the foremost block and the rearmost block, the foremost block being a block that is being displayed, on the display portion, foremost in the first direction, and the rearmost block being a block that is being displayed, on the display portion, rearmost in the first direction.

2. The printer according to claim 1, wherein
the computer-readable instructions further instruct the printer to perform processes comprising:
   displaying a cursor on the display portion, the cursor indicating a position where data for an additional character can be input to the print data; and
   inputting, in response to a command that is input from an input portion, the data for the additional character at the position where the cursor is displayed,
the block break line is a line segment that extends in a second direction that is a direction that is orthogonal to the first direction,
the cursor is a line segment that extends in the first direction,
the displaying the cursor on the display portion includes, in a case where the cursor is moved to a position of the block break line, displaying the cursor at one of the end sides, in the second direction, of the block break line, and
the inputting the data for the additional character includes, in a case where the command has been input from the input portion while the cursor is being displayed at the one of the end sides, in the second direction, of the block break line, inputting the data for the additional character to the print data in a block that is in front of the block break line.

3. The printer according to claim 1, wherein
the displaying, on the display portion, the characters, the block break line, and the block numbers includes:
   displaying a front end break line in front of a first block in the first direction, the front end break line indicating a position of a front end of the print data; and
   displaying a back end break line in back of a last block in the first direction, the back end break line indicating a position of a back end of the print data, and
the front end break line and the back end break line are displayed differently from how the block break line is displayed.

4. The printer according to claim 3, wherein
the front end break line and the back end break line are displayed differently.

5. A printer that is configured to print on a tape-type print medium, the printer comprising:
a processor; and
a memory configured to store computer-readable instructions that instruct the printer to perform comprising:
   displaying, on a display portion, characters, a block break line, and block numbers in a case where print data include block data and block break data, the block break line being a line segment that indicates a break position between adjacent blocks of a plurality of blocks, each of the plurality of blocks containing at least one line's worth of characters, the block numbers indicating sequence numbers for the plurality of blocks, the block data being data for the plurality of blocks, the block break data being data that indicate the break position, and the plurality of blocks being to be printed in a first direction in which the plurality of blocks are arrayed, wherein
   the displaying, on the display portion, the characters, the block break line, and the block numbers includes, in a case where a center position, in the first direction, of one of the plurality of blocks is being displayed on the display portion, displaying a block number of the one of the plurality of blocks adjacent to the center position of the one of the plurality of blocks.

* * * * *